United States Patent [19]

Way

[11] 3,805,060

[45] Apr. 16, 1974

[54] PHOTOELECTRIC CONTROL UNIT FOR SNAP ACTION SWITCH

[75] Inventor: John A. Way, North Haledon, N.J.

[73] Assignee: Wagner Electric Corporation, Newark, N.J.

[22] Filed: Jan. 22, 1973

[21] Appl. No.: 325,598

[52] U.S. Cl. .................. 250/206, 250/239, 337/141
[51] Int. Cl. .................. H01j 39/12
[58] Field of Search ............ 337/141, 138; 250/206, 250/239

[56] References Cited

UNITED STATES PATENTS

| | | | |
|---|---|---|---|
| 3,056,035 | 9/1962 | Bernheim | 250/239 |
| 3,305,654 | 2/1967 | Siiberg | 337/141 X |
| 3,019,318 | 1/1962 | Welsh | 337/141 X |

*Primary Examiner*—Walter Stolwein
*Attorney, Agent, or Firm*—Eyre, Mann & Lucas

[57] ABSTRACT

A photoelectric control unit for electrical load switching in response to light intensity comprising photoelectric means and a thermoelectric snap action switching device with a heater. The unit may be mounted on a conventional automobile flasher base. The heater in conjunction with the photoelectric means is capable of operation from an A.C. line source. The heater comprises a fine heater wire of relatively high resistance wound around a sleeve which is part of or placed in heat conductive engagement with the pull ribbon of the snap action device, or a film of relatively high resistance deposited upon a form which is placed in heat conductive engagement with the pull ribbon.

11 Claims, 5 Drawing Figures

PHOTOELECTRIC CONTROL UNIT FOR SNAP ACTION SWITCH

BACKGROUND OF THE INVENTION

This invention relates to a photoelectric control unit for the switching of electrical loads in response to light intensity. More particularly, this invention relates to the use of photoelectric means and a thermoelectric snap action switch to control an A.C. load such as a lamp. Thermoelectric switches are well known and a typical switch is described in U.S. Pat. No. 3,218,415.

The prior art of photoelectric controls for post lamp applications did not take advantage of the reliability of thermoelectric snap action devices and for example, employed bimetal strips with a heater element and magnets to give the metal strips a snap action. However, the magnets were of low magnetic force and when exposed to elevated temperatures, the magnetic force decreased substantially.

According to the present invention, the prior art disadvantages are overcome by the use of photoelectric means which responds to light intensity to actuate the thermoelectric snap action switching device. The design of the heater for the thermoelectric switch is such that the photoelectric control unit is capable of operation from an A.C. line source, without the high power dissapation of other units and using only two electrical components.

SUMMARY OF THE INVENTION

The invention is embodied in and carried out by photoelectric means combined with a thermoelectric switch. The thermoelectric switch comprises a pull ribbon-vane subassembly, a pair of contacts disposed for opening and closing by snap action of the pull ribbon-vane subassembly, and heater means to cause snap action of the pull ribbon-vane subassembly. The photoelectric means controls the current flow through the heater means in response to sensed light intensity to alter the energization state of the heater means, thereby causing the snap action in the thermoelectric switch to open and close the contacts.

Thermoelectric switches are well known in the flasher industry as evidenced for example by U.S. Pat. No. 3,218,415.

The heater means may be a resistive metal thick film deposited on a form which is part of or placed in heat conductive engagement with the pull ribbon or on the pull ribbon itself, or a fine highly resistive wire wound around a form which is part of or placed in heat conductive engagement with the pull ribbon or wound around the pull ribbon itself. The resistance may be made sufficiently high for the heater to be connected directly to an A.C. line.

BRIEF DESCRIPTION OF THE DRAWING

For a better understanding of the invention and various embodiments thereof, reference may be had to the accompanying drawings in which.

DESCRIPTION OF THE PREFERRED EMBODIMENTS

Figure 1:
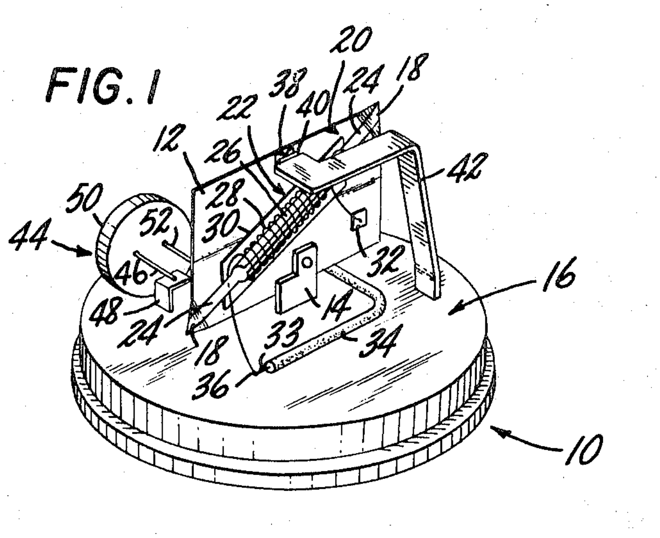
FIG. 1 is an isometric view of the control unit (without enclosure) showing the various elements of the photoelectric device and their connection and mounting.

Referring to FIG. 1, a photoelectric control unit is shown generally at 10. A buckling member or vane 12 is fastened to support member 14 which is affixed to and protrudes through (not shown) base 16 for connection to one lead of the power source (not shown) and one lead of the load to be controlled (not shown).

Attached to opposite corners 18 of buckling member 12 is a pull ribbon 20. Pull ribbon 20 is made up of a central heater portion 22 and connecting end portions 24. The control heater portion 22 may be made up of a flat stock INCONEL material, with ends having the same width as pull ribbon end portions 24. The central portion is wrapped around a rod (not shown) to form a sleeve-like metal form 26 about which is wound a fine wire heater 28. The wire is insulated to prevent shorting. The flat stock material has a typical width of from 0.220 inch to 0.250 inch which when formed around the rod yields a typical diameter of from 0.070 inch to 0.080 inch. The wire is typically 0.0012 inch diameter KARMA, which yields a capability of making a 7K ohms heater on a length of a 0.500 inch winding. The length of the formed portion of the ribbon is 0.650 inch.

One end of the wire winding 28 is connected to the buckling member 12 at 32. The other end of the wire winding 28 is connected to insulated wire 33 at point 36.

The heater must be electrically insulated from the buckling member (except at its point of connection at 32) and for best results an insulator 30 may be placed between the wire winding 28 and the buckling member.

Moveable electric contact 38 is connected to buckling member 12 and is positioned to make and break contact with the fixed electric contact 40 mounted on support 42. Support 42, similar to support 14 is affixed to and protrudes through (not shown) base 16 for connection to the second lead of the load to be controlled (not shown).

The manner of connection and mounting of the buckling member, the pull ribbon, the electric contacts and the support members is well known in the flasher industry. Photo cell 44 is fastened to base 16 by connection of photo cell lead 46 to support member 48.

Figure 4:
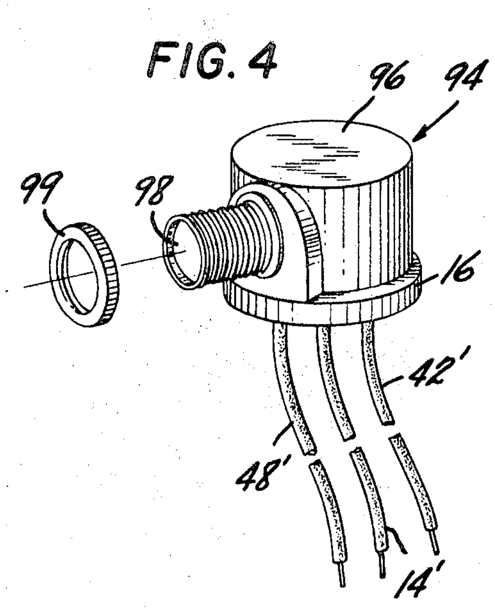
FIG. 4 is a view of the control unit with its enclosure.

Support 48, similar to supports 42 and 14, protrudes through (not shown) and is affixed to base 16 for connection to the second lead (not shown) of the power source. Photo cell sensor face 50 is positioned so that surrounding light will be incident upon the face of the photo cell, and is enclosed as shown in FIG. 4. Photo cell lead 52 is connected (not shown) to point 36 by wire 33 which is insulated with PVC material, 34.

The electrical connection of the control unit as shown in FIG. 1 is as follows. The photo cell 50 is connected to one terminal of the power source, the neutral terminal N at point 48' (FIG. 5) through photo cell lead 46 and support 48, and to one side of the heater 22 through photo cell lead 52, and connection 36. The other side of the heater 22 is connected to the other terminal of the power source, the line terminal L at point 14′ (FIG. 5) through connection 32, buckling member 12 and support 14. One electrical contact 38 is mounted on 12 and connected to the line terminal of the power source through the buckling member 12 and support 14. The other electrical contact 40 is mounted on and connected through support member 42 to the load terminal, LT (FIG. 5).

Figure 5:
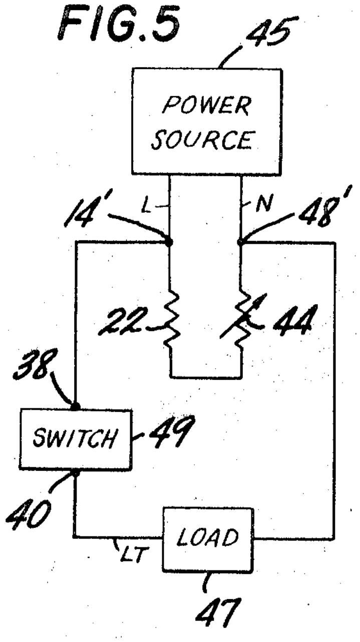
FIG. 5 is a schematic diagram of a circuit embodying the invention.

A schematic diagram is shown in FIG. 5 in which the photo cell 44 (shown schematically as a variable resistor) and the heater 22 (shown schematically as a resistor) are connected in a first series circuit with the power source 45. The electrical contacts 38 and 40 of switch 49, and the load 47 are connected in a second series circuit with the power source 45. The circuit is connected as follows: a first electric contact 38 of heat activated switch 49 is connected to a first terminal of power source 45 and to a first terminal of heater 22; a second electric contact 40 of heat activated switch 49 is connected to a first terminal of load 47; a second terminal of heater 22 is connected to a first terminal of photo cell 44; and a second terminal of photo cell 44 is connected to a second terminal of load 47 and to a second terminal of power source 45. The electrical switching portion of the invention is designated as 49 and makes and breaks contact of the electrical contacts 38 and 40, and is controlled by the current through heater 22.

The operation of the photoelectric control unit is as follows. Referring to FIG. 1, the unit operates as a normally closed relay with the buckling member 12 held in a constrained positioned by the pull ribbon 20 when cool and electric contacts 38 and 40 closed. Between the neutral terminal 48 and the line terminal 14 is a series circuit consisting of photo cell 44 and heater winding 28. When the light intensity incident upon the photo cell sensor face 50 is high, the photo cell resistance is very low and a maximum current, typically 11 ma. flows through the heater winding 28. The power in the heater winding 28 is dissipated in the form of heat which expands the pull ribbon 20 and allows the buckling member 12 to snap towards its inherent deformation thereby opening electric contacts 38 and 40 and breaking the circuit to the load.

When the light intensity incident upon photo cell sensor face 50 is low, the photo cell resistance increases sharply, thereby decreasing the current flow through the heater winding 28 to a typical value of 1.5 ma. With the heat produced by the heater winding 28 thereby substantially reduced, the pull ribbon cools and contracts to snap the buckling member into its constrained position whereby the electric contacts 38 and 40 make contact and close the circuit to the load, the unit then being in a normally closed relay position.

Figure 2:
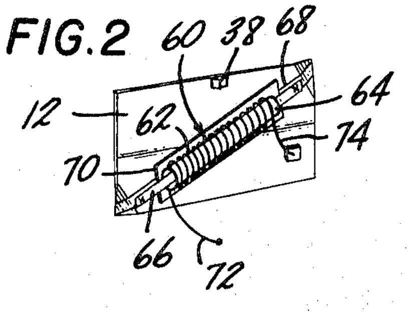
FIGS. 2 and 3 show the buckling member of FIG. 1 with other embodiments of the heating member.

FIG. 2 shows another embodiment of a heater 60 with the buckling member 12 of FIG. 1. A wire heater 62, similar to that shown in FIG. 1, is wound around a separate piece of fiberglass sleeving 64. The wound wire heater 62 and fiberglass sleeving 64 are secured on a length of nickle ribbon 66 which is shorter than the active pull ribbon 68 under tension. A thin strip of mica 70 is inserted between the buckling member 12 and the wire heater 62 before welding the active ribbon 68 and the nickle ribbon 66 to electrically insulate the heater wire 62 from the buckling member 12 and active pull ribbon 68. The nickle ribbon 66 is kept slack when welded at its ends so as not to interfere with the pull ribbon 68 and buckling member 12 travel. The wire heater is connected to the photo cell 44 and buckling member 12 by wire portions 72 and 74 respectively.

Figure 3:
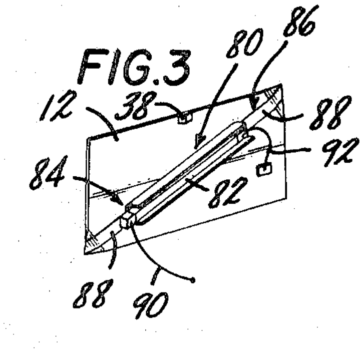

FIG. 3 shows another embodiment of heater 80 with buckling member 12 of FIG. 1. The heater element 82 is a thick film resistive deposit on a rectangular ceramic bar 84 with typical dimensions 0.020 inch × 0.050 inch × 0.900 inch. The ceramic bar 84 is formed separate from the pull ribbon 86 and is placed in heat transmitting engagement with the center portion of the pull ribbon 86 thereby insulating the pull ribbon 86 from the heater element 82. Pull ribbon end portions 88 are fastened to the buckling member 12 as shown in the embodiment of FIG. 1. The resistive film is connected to the photo cell 44 and buckling member 12 by wire portions 90 and 92 respectively. It is not essential that the ceramic bar 84 be formed separate of the pull ribbon 86, as it is satisfactory for the bar to be formed integral with the pull ribbon.

Referring to FIG. 4, the control unit in its enclosure is shown generally at 94. The enclosure 96 is mounted on the flasher-type base 16. Light is permitted to reach the photo cell sensor (not shown) through aperture 98. Knurled nut 99 is used to mount the control to a typical post lamp, by putting the threads through a mounting hole and tightening the nut 99. Leads 48′, 14′ and 42′ are for connection to the load and power source and are connected to supports 48, 14 and 42 respectively.

The photo cell used in the embodiment of FIG. 1 is manufactured by Clairex under part number CL 5P5. However, other photo cells, and other photoconductors and photoelectric devices other than the disclosed device are well known in the art and suitable to control current flow through the heater element. Although the embodiment of this invention is described with respect to operation from a line source, operation from other power sources is capable by proper design of the resistance value of the heating element, and by proper consideration of voltage and current requirements in the contacts for example.

Instead of the normally closed relay position the unit may be connected in a normally open relay whereby the electric contacts are open when the heater is cool and the light intensity is low, thereby supplying no power to the load in this position. Thus, it will be apparent to those skilled in the art, that the load may be switched on and off in any desired manner for a given light intensity by proper connection of the elements and by proper selection of the heater resistance.

The advantages of the present invention, as well as certain changes and modifications of the disclosed embodiments thereof, will be readily apparent to those skilled in the art. It is the Applicant's intention to cover all those changes and modifications which could be made to the embodiments of the invention herein chosen for the purposes of the disclosure without departing from the spirit and scope of the invention.

What is claimed is:

1. A photoelectric control unit for controlling enerization and de-energization of a load, comprising:

1. a flasher-type heat activated snap action switch comprising a pull ribbon buckling member snap action subassembly, a pair of contacts disposed for opening and closing by snap action of said pull ribbon buckling member subassembly, and heater means operative when energized to cause snap action of said pull ribbon buckling member subassembly; and 2. photoelectric means operative in response to sensed light intensity to alter the energization state of said heater means of said flasher-type heat activated snap action switch.

2. The photoelectric control unit of claim 1 wherein said photoelectric means comprises a two terminal photo cell including a sensor, the resistance between said terminals varying with the intensity of incident light upon said photo cell sensor.

3. The photoelectric control unit of claim 1 wherein said electric heater means comprises a fine highly resistive wire wound around a metal form and placed in heat conductive engagement with said pull ribbon of said flasher-type heat activated snap action switch.

4. The photoelectric control unit of claim 3 wherein the resistance of said heater is between 7K ohms and 12K ohms.

5. The photoelectric control unit of claim 3 wherein said metal form is integral with said pull ribbon.

6. The photoelectric control unit of claim 3 wherein said metal form is separate from said pull ribbon.

7. The photoelectric control unit of claim 1 wherein said heater means comprises a resistive film deposited on a bar of non-conducting material placed in heat conductive engagement with said pull ribbon of said thermoelectric switch.

8. The photoelectric control unit of claim 7 wherein the resistance of said heater means is between 7K ohms and 12K ohms.

9. A photoelectric control unit for energizing and deenergizing an electrical load, comprising in combination:

a. a flasher-type heat activated snap-action switch including a buckling member with an inherent deformation, a pull ribbon and a set of electrical contacts;

b. means for connecting said control unit to said load and to said power;

c. a heater for said pull ribbon; and d. photoelectric means including a sensor electrically connected to said power and to said heater to control the current through said heater in response to light intensity incident upon said sensor of said photoelectric means to make and break contact between said electrical contacts thereby supplying and interrupting power to said load.

10. An electrical circuit for controlling power from a power source to an electrical load comprising a flasher-type heat activated snap action switch including a buckling member with an inherent deformation, a pull ribbon, heater means associated with said pull ribbon, and a set of electrical contacts, and photoelectric means, wherein said heater means and said photoelectric means are connected in a first series circuit with said power source, and said electrical contacts and said load are connected in a second series circuit with said power source.

11. The circuit of claim 10 wherein said set of electrical contacts and said flasher-type heat activated snap action switch are controlled by the current through said first series circuit to thereby open and close said second series circuit.

* * * * *